United States Patent [19]

Friesen et al.

[11] Patent Number: 5,108,464
[45] Date of Patent: Apr. 28, 1992

[54] COUNTERCURRENT DEHYDRATION BY HOLLOW FIBERS

[75] Inventors: Dwayne T. Friesen; Roderick J. Ray; David D. Newbold; Scott B. McCray, all of Bend, Oreg.

[73] Assignee: Bend Research, Inc.

[21] Appl. No.: 673,128

[22] Filed: Mar. 20, 1991

Related U.S. Application Data

[63] Continuation-in-part of Ser. No. 409,428, Sep. 19, 1989, Pat. No. 5,002,590.

[51] Int. Cl.⁵ .................... B01D 53/22; B01D 71/68
[52] U.S. Cl. ........................................ 55/16; 55/68; 55/158
[58] Field of Search ................... 55/16, 68, 158

[56] References Cited

U.S. PATENT DOCUMENTS

| | | | |
|---|---|---|---|
| 3,144,313 | 8/1964 | Pfefferle | 55/16 |
| 3,339,341 | 9/1967 | Maxwell et al. | 55/16 |
| 3,511,031 | 5/1970 | Ketteringham et al. | 55/158 |
| 3,735,558 | 5/1973 | Skarstrom et al. | 55/16 |
| 4,497,640 | 2/1985 | Fournie et al. | 55/16 |
| 4,583,996 | 4/1986 | Sakata et al. | 55/16 |
| 4,687,578 | 8/1987 | Stookey | 55/158 X |
| 4,718,921 | 1/1988 | Makino et al. | 55/16 |
| 4,725,359 | 2/1988 | Ray | 210/640 |
| 4,783,201 | 11/1988 | Rice et al. | 55/16 |
| 4,793,830 | 12/1988 | Murphy et al. | 55/16 |
| 4,857,081 | 8/1989 | Taylor | 55/16 |
| 4,871,378 | 10/1989 | Pinnau | 55/16 |
| 4,875,908 | 10/1989 | Kikukawa et al. | 55/16 |
| 4,881,954 | 11/1989 | Bikson et al. | 55/16 |
| 4,881,955 | 11/1989 | Bikson et al. | 55/16 |
| 4,900,626 | 2/1990 | Fabre | 428/398 |
| 4,931,070 | 6/1990 | Prasad | 55/16 |
| 4,961,759 | 10/1990 | Taylor | 55/16 |
| 4,961,760 | 10/1990 | Caskey et al. | 55/158 |
| 4,981,498 | 1/1991 | Bikson et al. | 55/16 |
| 4,990,165 | 2/1991 | Bikson et al. | 55/16 X |
| 5,002,590 | 3/1991 | Friesen et al. | 55/16 |
| 5,013,437 | 5/1991 | Trimmer et al. | 55/16 X |

FOREIGN PATENT DOCUMENTS

| | | | |
|---|---|---|---|
| 54-015349 | 5/1979 | Japan | 55/158 |
| 62-241527 | 10/1987 | Japan | 55/16 |
| 63-111923 | 5/1988 | Japan | 55/158 |
| 63-123422 | 5/1988 | Japan | 55/158 |
| 1-176425 | 7/1988 | Japan | 55/16 |
| 1-224028 | 9/1989 | Japan | 55/16 |
| 2-083015 | 3/1990 | Japan | 55/16 |
| 2-135118 | 5/1990 | Japan | 55/16 |

*Primary Examiner*—Robert Spitzer
*Attorney, Agent, or Firm*—Chernoff, Vilhauer, McClung & Stenzel

[57] ABSTRACT

A gas dehydration method and apparatus are disclosed which utilize lumen-side feed, hydrophilic polymer-inside-coated, thin-film composite hollow fiber membranes, the support fiber of which is highly permeable, such composite membranes being used in a module wherein the permeate flows countercurrent to the flow of the feed, and in which dried raffinate gas is mixed with water-containing permeate at a point opposite the feed end of the module.

25 Claims, 2 Drawing Sheets

COUNTERCURRENT DEHYDRATION BY HOLLOW FIBERS

This invention was made with government support under Contract No. N00167-88-C-0026 awarded by the U.S. Department of Defense. The government has certain rights in this invention.

This is a continuation-in-part of application Ser. No. 409,428, filed Sep. 19, 1989, now U.S. Pat. No. 5,002,590.

BACKGROUND OF THE INVENTION

Hollow fiber membrane-based dehydration is known. See, for example, U.S. Pat. Nos. 4,783,201, 4,725,359, 4,718,921, 4,497,640, 4,583,996 and 3,511,031. U.S. Pat. No. 4,793,830 discloses a process for removing small amounts of water and carbon dioxide from compressed air to generate ultrapure instrument quality gas with silicone-coated hollow fibers. However, the water vapor permeability and selectivity of the membranes of this patent are far less than those for the membranes of the present invention, resulting in far less efficient dehumidification. U.S. Pat. No. 4,900,626 discloses a hollow composite fiber for dehydration having a polydimethylsiloxane coating on a dense layer of the fiber support, the support thus having relatively low permeability.

For a variety of reasons, no known prior art approach has been able to achieve a high degree of efficiency while maintaining a low-cost, simple design. The reason for this appears to be that, while the theory of gas dehydration is ostensibly simple, in practice the task often proves to be quite complex due to an unusually large number of factors that come into play when hollow fiber separation membranes are used, such as the resistance, selectivity and permeability of the permselective layer, the resistance, selectivity, and permeability of the support fibers, and the resistance of the module. In addition, the relative values of these resistances and the directions of feed and permeate and sweep gases also impact the fluxes of the various permeating species, and thus, the overall performance of the module.

It is therefore an object of the present invention to provide a highly efficient method and apparatus for gas dehydration.

It is a further object of the present invention to provide a low-cost and easy-to-operate gas dehydration module.

It is a still further object of the present invention to provide a novel, highly selective composite hollow fiber membrane.

These and other objects, which will become apparent to one of ordinary skill, are accomplished by the present invention, which is summarized and described in detail below.

SUMMARY OF THE INVENTION

The present invention comprises a novel gas dehydration method and apparatus, the latter comprising a bundle of lumen-side feed, thin-film composite hollow fibers arranged substantially parallel to each other in a chamber or module with a permeate port located near the feed end of the module, the composite fibers comprising a support of very high permeability and a thin dense coating on the inside or lumens of the fibers, the flow of the permeate being countercurrent to that of the feed. In two closely related aspects of the invention, a class of highly selective coatings for the composite fibers has been discovered, as well as an improved method of using the hollow dehydration fibers that utilizes a sweep gas made up of a portion of a dried gas raffinate.

DETAILED DESCRIPTION OF THE INVENTION

A good membrane process for dehydration has three essential characteristics. First, the process must be capable of removing water vapor from the feed gas to the desired dewpoint. Second, the water vapor separation takes place with as little loss of feed gas to the permeate as possible. In fact, there is a theoretical minimum feed gas loss for efficient dehydration by membranes. This stems from the fact that the partial pressure of water vapor in the gas leaving as permeate from the membrane module cannot exceed the partial pressure of water vapor in the feed gas entering the membrane module. An efficient membrane process for dehydration will have a feed gas loss that approaches this theoretical minimum. Third, the process must economically perform this separation; in other words, the membrane surface area required to perform a given water vapor separation should be as small as possible.

The following definitions are used herein.

"Intrinsic permeability" is the inherent permeability of a material that has no microporous structure and dependent only upon the composition of the material.

"Intrinsic selectivity" is the inherent selectivity of a material that has no microporous structure and dependent only upon the composition of the material.

"Effective permeability" is the permeability of a material measured when the material is actually used as a membrane in a separation process, taking into consideration its microporosity, mass transfer effects and various operating variables such as temperature, dewpoint, pressure of the feed, raffinate, and permeate streams, and mixing of the permeate gas with drier gas from the raffinate end of the module. Unless otherwise noted, in all of the Examples herein, references to air or water permeabilities or ratios of the same, are to effective permeabilities obtained at standard conditions of 100 psi(786kPa), 35° C. dewpoint, 37° C. dry bulb for the feed; 100 psi(786kPa), −2° C. dewpoint, 37° C. dry bulb for the raffinate; and atmospheric pressure and 23° C. dry bulb for the permeate.

"Effective selectivity" is the selectivity of a material measured when the material is actually used as a membrane in a separation process, taking into consideration the same parameters noted above in connection with the definition of effective permeability.

"Gas loss" is the ratio of the total permeate flow to the total feed flow.

"Sweep" is that portion of raffinate flow that is introduced into the permeate at a port located nearest the raffinate end of the module.

"Specific feed flow rate" is the total feed flow rate divided by the total membrane surface area of the module.

"Theoretical minimum gas loss" is the gas loss that would be required to perform a given dehydration separation using an ideal, infinitely selective membrane, calculated herein by use of a mathematical model of the process of the present invention.

The performance of a dehydration module may be characterized by three parameters and by their relationship to each other: (1) dewpoint of raffinate; (2) gas loss; and (3) specific feed flow.

In general, it may be said that the performance of a dehydration module is better if it has (1) a low raffinate dewpoint, (2) a low gas loss, and (3) a high specific feed flow. For example, assume two dehydration modules, A and B. If A and B both dehydrate gas to the same dewpoint with the same gas loss, but the specific feed flow of module A is greater than that of module B, then it may be said that module A has better performance. Similarly, if the raffinate dewpoints are the same and the specific feed flows are the same, module A has better performance than module B if its gas loss is lower. Finally, if the gas losses and specific feed flows for A and B are the same, then module A performs better if its raffinate dewpoint is lower than that of module B.

Consistent with these principles, there are two key elements of an effective hollow fiber dehydration method and apparatus: (1) a membrane that is selective for water vapor over the feed gas to be dried; and (2) a module design that allows removal of the water vapor without excessive losses of feed gas. The impetus of the present inventions lies in the discovery of a method of combining these key elements.

The driving force for the transport of water vapor across a membrane is its partial pressure difference across the membrane. In the case of a composite hollow fiber membrane module, this driving force will be greatest when there is a large differential in the resistance to gas flow of the coating on the lumens of the support fiber on the one hand, and, on the other hand, the sum of the resistances of a gas-phase boundary layer on the lumen side of the membrane, the support fiber itself, and that of a chamber or module containing the fibers. Since water flux through a composite membrane is inversely proportional to the total of all the resistances mentioned above, i.e., the resistances of the coating, of the gas phase boundary layer, of the support fiber, and of the module, achieving high water flux requires that the resistance of the coating (as well as the other resistances) to the permeation of water vapor be low. At the same time, however, to maintain high water selectivity, the relationship of resistances to the flow of gas to be dried must be such that the resistance of the coating is much greater than the sum of the resistances of the gas phase boundary layer, the support fiber and the module. This is so since the selectivity of the overall process toward water over the gas to be dried is the ratio of the sum of all the resistances to gas transport to the sum of all the resistances to water transport. Heretofore, it has been a widely held belief that the only critical factor in achieving highly selective separations by membranes has been the selectivity of the permselective layer of the membrane, and that the characteristics of the support, module and boundary layer were relatively unimportant. Contrary to this conventional wisdom, it has been discovered that a critical rate-limiting factor governing high water flux and selectivity is the resistance of the support of the hollow fiber composite membrane.

As an extension of this discovery, it has been found that highly efficient dehydration is obtainable by the use of a highly permeable support fiber with a thin dense coating on the inside or lumens thereof. The highly permeable support permits high water flux therethrough while the thin dense coating on the support allows the adjustment of the permeation rate of the gas to be dried to a low value relative to the permeation rate of the water, yet, quite surprisingly, has no material impact on the water flux through the support, unless the permeability of the coating to water is so low that it approaches the permeability of the support.

As a further extension of this discovery, it has been found that hydrophilic polymeric coatings on the inside of such highly permeable support fibers result in even more efficient gas dehydration.

In most cases, the partial pressure of water vapor in a gas at saturation is very low. Therefore, the partial pressure driving force for water vapor transport must be provided by one of three methods or combinations thereof: (1) the sweep method, in which dry gas from an external source is swept proximate to the permeate side of the membrane; (2) the vacuum method, in which a vacuum is applied to the permeate side of the membrane; or (3) the dilution method, in which the permeate is left at, for example, atmospheric pressure, but a small percentage of the feed gas is allowed to permeate the membrane, diluting the water vapor content of the permeate. In all three cases, the driving force for the permeation of the water vapor in the feed gas is provided by the large water vapor partial pressure difference between the feed and the permeate.

To obtain the desired large partial pressure differential between the feed gas and the permeate, an optimal amount of feed gas is desirably present in the permeate. This optimal amount may be obtained by (1) adjusting the permeability of the composite membrane, (2) by introduction of a portion of the dried gas raffinate to the permeate, thereby diluting it, and by combinations of (1) and (2).

It has now been discovered that the methods of either vacuum alone and either vacuum or dilution with sweep result in substantially increased dehydration efficiency of the highly permeable support composite hollow fiber modules of the present invention. For these methods to be practical, the membranes must be highly permeable to water vapor and relatively impermeable to the feed gas.

The composite hollow fiber lumen-side-feed membranes of the present invention are easily "tuned" to the proper permselectivity: the transport of water vapor across the membrane is determined by the resistance of the highly permeable support fiber to water vapor permeation, while the transport of the gas to be dried is determined by the resistance of the selective coating on the lumens of the fibers to gas transport.

As mentioned above, the second key element to the successful development of a hollow fiber dehydration system is the design of the module. It must contain enough membrane area to efficiently carry out the desired separation and have the proper hydraulic characteristics on the permeate side of the membrane, which characteristics involve the direction and nature of the flow of the permeate and the resistance to permeate flow.

Figure 1:
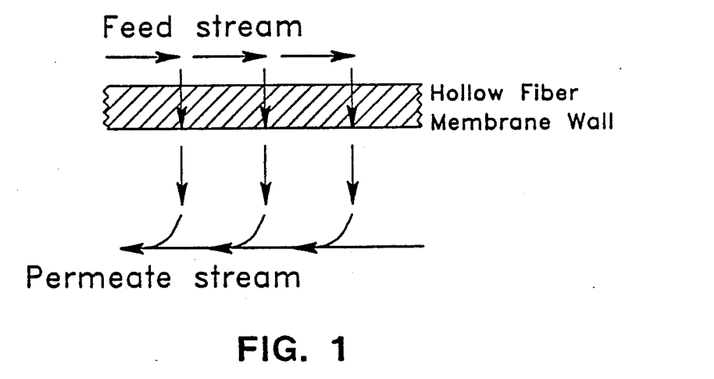
FIG. 1 is a schematic drawing showing a crossflow mode of permeate flow in a hollow fiber membrane.

At least two general flow patterns are possible on the permeate side of the module: cross-flow and counter-flow. In the cross-flow configuration, shown in FIG. 1, the permeate passes through the permselective layer of the membrane and then exits the module. All of the gas required to dilute the permeate stream comes from the feed gas. In cross-flow, the gas (water vapor and gas to be dried) on the permeate side of a given section of the membrane is the gas that permeated that section. Thus, it does not mix with the other gas that permeates other sections of the membrane in such a way as to affect the permeation through that section. In cross-flow, the boundary layer on the permeate side of the membrane is sufficiently large that permeation through the membrane is not affected by the composition of gas in the permeate, even if the bulk flow of permeate gas runs in a direction opposite to feed flow, as shown in the lower portion of FIG. 1; in such a configuration, as water vapor is removed from the feed stream and the water vapor partial pressure becomes small, the amount of feed gas that must permeate the membrane becomes quite large.

Figure 2:
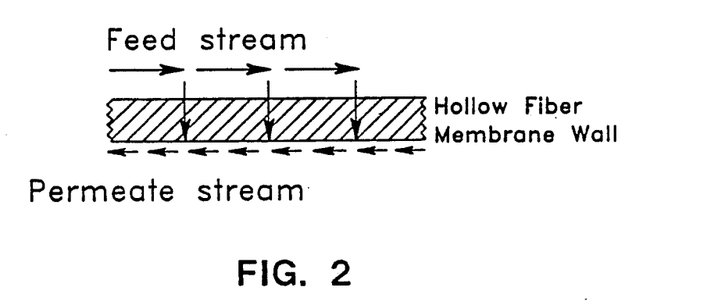
FIG. 2 is a schematic drawing showing a countercurrent flow mode of permeate flow in a hollow fiber membrane.

The use of a counter-flow configuration, shown in FIG. 2, is preferred in the present invention. Such counter-flow, combined with a module design that leads to a uniform linear velocity with no channeling on the permeate side of the membrane (referred to as "plug flow") and a low resistance hollow-fiber support, can minimize the feed gas loss. In the counter-flow configuration, the permeate passes through the membrane and mixes with the permeate gas from the raffinate end of the module in such a way as to lower the partial pressure of water in contact with the permeate side of the membrane, and exits the module in the direction opposite that of the feed flow. The gas that permeates the membrane at the drier (raffinate) end of the module moves toward the wetter (feed) end of the module after it permeates the membrane. Unlike the cross-flow configuration, in which the gas on the permeate side of a given section of membrane is the gas that permeated that section, in the counter-flow configuration the permeating dry gas from the raffinate end of the module mixes with the gas permeating a given section of membrane, thus helping to accomplish dilution. Thus, less gas is needed from the feed stream to dilute the permeate, and feed gas loss is minimized. Such feed gas loss is further minimized with the use of a portion of the dried gas raffinate as a sweep gas that is introduced counter-current to the general direction of flow of the feed gas, preferably at a point generally opposite the feed and of the module.

It has been discovered that at least three conditions must be fulfilled simultaneously to achieve true counter-flow in a gas-drying membrane module. First, the permeate and sweep flows must be in a direction opposite to that of the feed flow. This allows the permeate and the dried gas raffinate at the drier end of the module to dilute the permeate at the wetter end of the module. Second, the boundary layer on the permeate side of the membrane must be sufficiently small to allow mixing of (a) the bulk gas that has already permeated and is located on the outside of the fibers with (b) the gas that is permeating a given section of the membrane. This is best achieved in a module design that allows a uniform and relatively high linear velocity with no channeling on the permeate side of the membrane. Such uniform and high linear velocity is in turn achieved by having (1) a high packing density of fibers (preferably greater than 40%), and (2) uniformly-distributed fibers. Third, the resistance of the support membrane must be sufficiently small to allow mixing of (a) the bulk gas permeate with (b) the gas permeating the membrane. These three conditions are most easily satisfied by using the lumen-side feed, thin-film composite hollow fiber module of the present invention.

Thus, according to the present invention, there is provided a dehydration module for removing water vapor from a feed gas comprising (a) a chamber having feed and raffinate ends and a permeate port near the feed end; (b) a bundle of thin film composite hollow fiber membranes arranged substantially parallel to each other in said chamber and relatively uniformly spaced other in said chamber, preferably with a packing density of 40% to 90%, each of said composite hollow fiber membranes having an effective water vapor permeability greater than $33 \times 10^{-4}$ $cm^3/cm^2 \cdot sec \cdot cmHg$ (200 SCFH/ft$^2 \cdot$100psi), preferably greater than $83 \times 10^{-4}$ $cm^3/cm^2 \cdot sec \cdot cmHg$ (500 SCFH/ft$^2 \cdot$100 psi), an effective air permeability of less than $1.3 \times 10^{-4}$ $cm^3/cm^2 \cdot sec \cdot cmHg$ (8 SCFH/ft$^2 \cdot$100 psi), preferably less than $0.08 \times 10^{-4}$ $cm^3/cm^2 \cdot sec \cdot cmHg$ (0.5 SCFH/ft$^2 \cdot$100 psi), and a ratio of effective water vapor permeability to effective feed gas permeability (water vapor selectivity) of at least 100, preferably at least 180, and comprising (i) a highly permeable support fiber having an effective air permeability greater than $33 \times 10^{-4}$ $cm^3/cm^2 \cdot sec \cdot cmHg$ (200 SCFH/ft$^2 \cdot$100 psi), preferably greater than $165 \times 10^{-4}$ $cm^3/cm^2 \cdot sec \cdot cmHg$ (1000 SCFH/ft$^2 \cdot$100 psi), and most preferably greater than $330 \times 10^{-4}$ $cm^3/cm^2 \cdot sec \cdot cmHg$ (2000 SCFH/ft$^2 \cdot$100psi), and a ratio of effective water vapor permeability to effective air permeability (water vapor selectivity) of less than 2, and (ii) a coating on the lumens of said support fiber, said coating consisting essentially of a hydrophilic polymer that has a ratio of effective water vapor permeability to effective feed gas permeability of at least 100, preferably at least 180; and (c) sealing means for securing and sealing said bundle of hollow fiber membranes to said chamber shell at said feed and raffinate ends so as to permit the lumens of the hollow fiber membranes to be in fluid communication with said feed gas; wherein said permeate port is in fluid communication with the outside of said hollow fiber membranes.

Further, the present invention provides a gas dehydration process comprising: (a) contacting a feed gas containing water vapor with the lumen side of the thin film composite hollow fiber membranes of the same dehydration module noted above, the chamber of the module having a feed end and a raffinate end and a permeate port near the feed end; (b) permitting water in said feed gas to permeate from the lumens to the outside of the hollow fiber membranes to form a water-containing permeate and a dried gas raffinate; and (c) removing permeated water from said chamber at a point near the feed end of said chamber.

Figure 3:
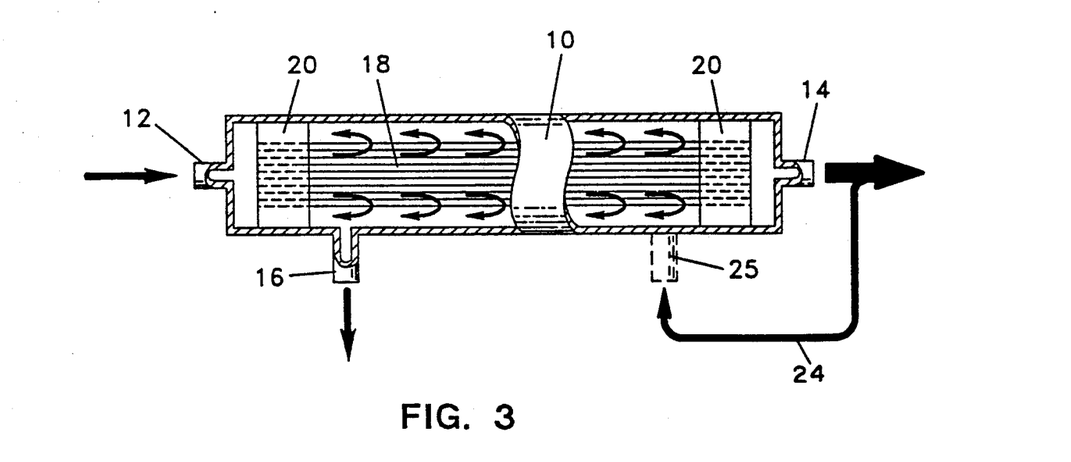
FIG. 3 is a schematic drawing of an exemplary embodiment of the present invention.

FIG. 3 shows a cross sectional schematic of a chamber or module 10 having a feed port 12, a raffinate port 14, a permeate port 16, thin-film composite hollow fiber membranes 18 arranged substantially parallel to each other, and sealing means 20, such as plugs of thermoplastic or thermosetting polymeric potting compound, at both ends of the module that secure and seal the bundle 18 to the module at both ends so as to permit the inside or lumens of the hollow fiber membranes to be in fluid communication with the feed gas. The feed gas to be dried is fed to the inside or lumens of the hollow fibers, thereby permitting water vapor in the feed gas to permeate from the lumens to the outside of each fiber, which in turn causes the permeate port 16 to be in fluid communication with the outside of the fibers, and further requires the permeate to flow countercurrent to the direction of flow of the feed gas, as indicated by the bent arrows in FIG. 3. Note that, with such an arrangement, relatively drier gas from the permeate at the raffinate end of the module is mixed with relatively more wet gas from the permeate at the feed end of the module, which when combined with the module design of the present invention and a high-permeability support, enhances the driving force of water, as explained above.

An especially preferred mode of operation of the process of the present invention is the use of a sweep stream comprising a portion of dried raffinate gas, shown schematically as element 24 in FIG. 3. The portion may be from about 2% to about 50% of the total dried raffinate gas, preferably less than 30%, and most preferably from 10 to 15%. The dried raffinate gas is mixed with the water-containing permeate at a point generally opposite the feed end of the module, preferably through a port near the raffinate end of the module, such as the permeate port 25 shown in phantom in FIG. 3. Use of such a raffinate sweep results in substantial increases in the effective water vapor permeability and water vapor selectivity of the hollow fiber dehydration modules of the present invention, thus increasing the amount of feed air that can be dried with the same percentage air loss, while producing the same raffinate dewpoint.

Figure 4A:
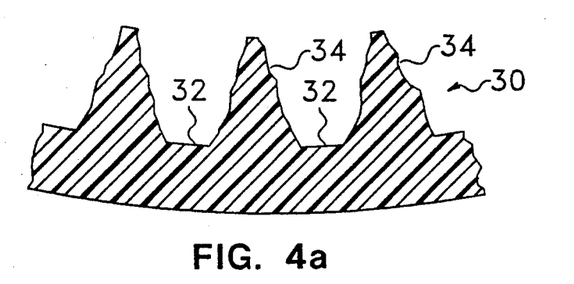
FIGS. 4a–4c are conceptualized schematic drawings of a cross-sectional portion of the hollow fiber membrane of the present invention.
Figure 4B:
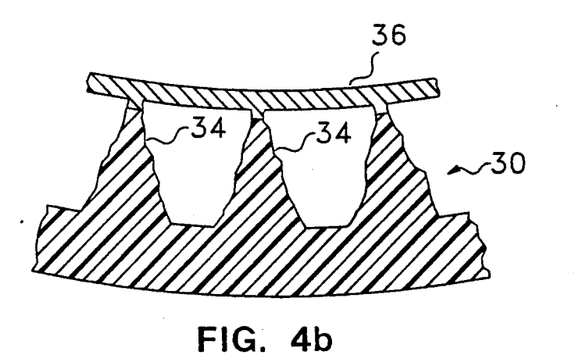
Figure 4C:
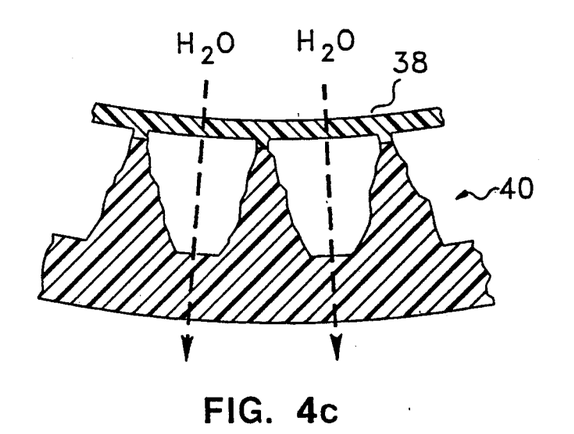

FIGS. 4a–4c are conceptualized schematics showing the formation of a thin-film composite membrane 40 by, for example, interfacial polymerization. FIG. 4a shows a cross sectional view of an enlarged portion of the wall of an asymmetric polymeric hollow fiber support 30 that is highly permeable and having high porosity, the pores being formed by alternating valleys 32 and projections 34. The support fiber is contacted with an aqueous prepolymeric solution which adheres as a layer 36 to the projections 34, extending into the support a short distance as indicated in FIG. 4b. Next, as shown in FIG. 4c, the prepolymeric layer 36 is either crosslinked or copolymerized into a thin dense permselective film 38, which permits permeation of water vapor in the direction shown, from the lumens to the outside of the composite hollow fiber membrane 40.

As mentioned above, the support fiber must be highly permeable to air and must have a water vapor selectivity of less than 2. Suitable polymeric materials for formation of the support fiber by conventional methods are polypropylene, polyvinylideneflourides, polyetherimides, polyimides, polysulfones, polyethersulfones, polyphenylsulfones and polyphenylquinoxalines. Suitable inorganic materials for the support fiber include porous tubes of glass, ceramic and metal.

As mentioned previously, the coating 38 on the support fiber is preferably a hydrophilic polymer that has a water vapor selectivity of at least 100. "Hydrophilic," in reference to the polymer coating, refers to a polymer that contains greater than 1 mole of hydrophilic groups per 200 grams of polymer. Exemplary hydrophilic groups include, by way of example, acetals, ketals, acid anhydrides, aryl halides, alcohols, aldehydes, amides, amines, azides, carboxylic acids, esters, ethers, imines, ketones, nitriles, nitros, sulfonamides, sulfonate esters, sulfones, sulfonic acids, sulfoxides, thiols, siloxanes, phosphoric acids, phosphonates, and thioesters.

Suitable hydrophilic polymers for the coatings on the support fibers include polyvinyl alcohol (PVA), polyethylene vinyl acetate, polyvinyl acetate, polyhydroxy phenols, polymethylmethacrylate, cellulose acetate (CA), ethyl cellulose, polyamides, polyureas, polyurethanes, polyglycols and polyamyl alcohols.

A particularly preferred class of hydrophilic polymeric coatings is that formed by the interfacial polymerization of two polyfunctional compounds containing functional groups that are mutually reactive in a condensation reaction. Examples include the reaction of polyfunctional amines or alcohols with polyfunctional acyl halides or isocyanates. More specific examples include the interfacial polymerization of: polyethyleneimine (PEI) with dicarboxylpropyl acid halide-terminated polydimethylsiloxane; p-xylylenediamine (pXDA) with trimesoyl chloride (TMC); PEI with toluene diisocyanate (TDI); PEI with isophthaloyl chloride (IPC); and m-phenylenediamine (mPDA) with TMC.

Post-treatment of such hydrophilic polymeric coatings with a low molecular weight polyfunctional compound that is reactive with the functional groups in the polymeric coatings also enhances selectivity of the coating. Examples of suitable post-treating compounds include all of the polyfunctional compounds mentioned above in connection with the formation of hydrophilic coatings by interfacial polymerization.

The resulting composite hollow fiber membrane has the effective water vapor permeability mentioned above and a water vapor selectivity of at least 100, preferably at least 180. Higher selectivities for water vapor over the gas to be dried are preferred if minimizing gas loss is desired, and are obtained by using a coating with a low gas permeability. For best effect, the composite fibers should be arranged substantially parallel to each other as shown in FIG. 3. In addition, the spacing between the fibers should be such that any axial dispersion effects on the permeate side of the fiber, i.e., diffusion of water vapor against the countercurrent flow, are minimized. A packing density of 40%–90% of the cross sectional area of the chamber or module is adequate for most applications.

The feed gas may comprise virtually any condensable or noncondensable gas containing water vapor in any concentration. Typical applications include dehumidification of air, lower hydrocarbons such as those containing 1 to 3 carbon atoms per molecule, and acid gases such as carbon dioxide, sulfur dioxide and ammonia.

Referring to FIG. 3, in operation, the water vapor-containing feed gas is fed through feed port 12 to the lumens of hollow fiber membranes in bundle 18, at a pressure greater than the pressure at permeate port 16, and preferably at a pressure of at least 1.0 atm (101 kPa), most preferably at >7 atm (707 kPa). A vacuum may be applied to the permeate port 16 to lower the permeate pressure relative to the feed gas pressure. Water vapor preferentially permeates first the selective hydrophilic thin coating 38 on the lumens of the composite hollow fiber membrane 40, which coating is semipermeable to the feed gas, then the highly permeable support wall in the direction indicated in FIG. 4c. Because of the arrangement of the fibers and configuration of the module, water vapor permeate flows countercurrent to the flow of the feed gas, exiting the module through permeate port 16. The dried gas raffinate exits through raffinate port 14, and a portion 24 thereof is returned to the permeate side of the fibers in the chamber via port 25, thereby mixing with and diluting the permeate stream.

EXAMPLE 1

Highly permeable microporous-walled hollow support fibers were prepared at 23° C. from a casting solution consisting of 25 wt % polyvinylidene flouride (PVDF), 10 wt % cyclohexanone, 5 wt % polyvinyl pyrrolidene (PVP), all in dimethylacetamide (DMAC). The casting solution was pressurized to 15 psi (203 kPa) with compressed helium gas, forcing the casting solution at a flow rate of about 1.5 g/min to a spinneret having an inner needle diameter of 250 microns and an outer orifice diameter of 1300 microns. The tip of the spinneret was 1 cm above a precipitation bath comprising fresh water at 15° C. An aqueous lumen-forming solution consisting of 30 vol% DMAC was fed to the spinneret simultaneously, and the flow regulated with a needle valve.

The precipitated fibers had an average dwell time of 20 seconds in the precipitation bath and, contemporaneously with precipitation, were drawn up on a take-up reel, which was then immersed in a second fresh water bath where they were rinsed for several hours at 20° C., then allowed to air dry at room temperature for 24 hours. The so-formed hollow fiber supports had an average inside diameter of 450 microns, average outside diameter of 724 microns, and average wall thickness of 137 microns.

Burst strength by internal pressurization was determined by selecting a representative hollow fiber, forming a loop with the fiber by connecting both ends to a common fitting on a static hydraulic water pressure valve, and then pressurizing the inside of the fiber at a rate which increased about 10 psi (69 kPa) per second until the fiber actually burst. The hollow fiber supports so prepared had average burst pressure of 292 psi (2000 kPa).

Air permeability of the hollow fiber supports was determined by incorporating them in bundles into modules of substantially the design shown in FIG. 3, using a two-part polyurethane-based potting compound, then internally pressurizing the hollow fibers with oxygen and measuring the oxygen permeation rate, then calculating the air permeability therefrom, which was approximately $1.3 \times 10^{-4}$ $cm^3/cm^2 \cdot sec \cdot cmHg$ (8SCFH/ft$^2$·100 psi). The ratio of effective water vapor permeability to effective air permeability was 1.3.

EXAMPLE 2

Another batch of highly permeable microporous-walled hollow support fibers was prepared at 30° C. from a casting solution consisting of 22 wt % polyethersulfone (PES), 10 wt % n-propanol (NPr), and 5 wt % H$_2$O, all in DMAC, using the procedure described in Example 1 with the exceptions noted. The flow of casting solution to the spinneret was about 2.0 g/min. The aqueous lumen-forming solution consisted of 60% DMAC. The inner needle diameter was 405 microns. The precipitation bath temperature was 25° C., and the precipitated fibers had an average dwell time of 15 seconds.

The hollow support fibers so prepared were annealed by immersing them in 90° C. water for 60 minutes after they had been rinsed for several hours at 20° C., then allowed to air dry at room temperature for 24 hours. The so-prepared fibers had an average inside diameter of 600 microns, average outside diameter of 820 microns, average wall thickness of 110 microns, average burst pressure of 300 psi (2100 kPa) and an effective air permeability of approximately $250 \times 10^{-4}$ $cm^3/cm^2 \cdot sec \cdot cmHg$ (1500 SCFH/ft$^2$·100 psi). The ratio of effective water vapor permeability to air permeability of the fiber was 1.3.

EXAMPLES 3-12

Additional highly permeable microporous-walled hollow support fibers were prepared in substantially the same manner as in Example 1 from the casting solutions listed in Table I, and varying the other parameters noted in Table I; temperatures of the casting solution were 30° C. for Examples 3-11 and 50° C. for Example 12. The so-prepared fibers had average burst pressures, dimensions, and effective air permeabilities as indicated in Table II.

TABLE I

| Ex. No. | wt % Casting Solution Components | | | | | Vol % DMAC Lumen-Forming Solution | Inner Needle Diam (um) | Polymer Flow Rate (g/min) | Ppn Bath Temp (°C.) | Ppn Bath Dwell (sec) | Annealing Conditions | |
|---|---|---|---|---|---|---|---|---|---|---|---|---|
| | PES | DMAC | NPr | H$_2$O | PVP | | | | | | Temp (°C.) | Time (min) |
| 3 | 27 | 57.25 | 10 | 4.5 | 0.25 | 62 | 250 | 1.5 | 30 | 15 | 100 | 30 |
| 4 | 24 | 61.0 | 10 | 5.0 | 0 | 60 | 635 | 4.0 | 28 | 12 | 90 | 60 |
| 5 | 24 | 64.0 | 10 | 2.0 | 0 | 70 | 254 | 1.5 | 20 | 15 | 90 | 30 |
| 6 | 27 | 63.0 | 10 | 0 | 0 | 60 | 635 | 5.5 | 16 | 10 | 90 | 45 |
| 7 | 25 | 63.0 | 10 | 0 | 2.0 | 70 | 250 | 5.5 | 16 | 14 | 90 | 45 |
| 8 | 25 | 63.0 | 10 | 0 | 2.0 | 70 | 250 | 5.5 | 16 | 12 | 90 | 45 |
| 9 | 24 | 64.0 | 10 | 2.0 | 0 | 70 | 250 | 5.5 | 16 | 11 | 90 | 45 |
| 10 | 24 | 64.0 | 10 | 2.0 | 0 | 60 | 250 | 5.5 | 17 | 14 | 90 | 45 |
| 11 | 22 | 63.0 | 10 | 5.0 | 0 | 60 | 405 | 2.0 | 25 | 15 | 90 | 60 |
| 12 | 22 | 63.0 | 10 | 5.0 | 0 | 62 | 405 | 2.0 | 25 | 15 | 90 | 60 |

TABLE II

| Ex. No. | Burst Pressure psi (10$^3$ kPa) | Effective Air Permeability*() | Fiber Dimensions (microns) | | | min. Water* Air |
|---|---|---|---|---|---|---|
| | | | i.d. | o.d. | wall | |
| 3 | 860 (5.9) | 58 (352) | 284 | 627 | 171 | 1.3 |
| 4 | 270 (1.9) | 200 (1200) | 635 | 813 | 83 | 1.3 |
| 5 | 420 (2.9) | 180 (1105) | 330 | 482 | 64 | 1.3 |
| 6 | 290 (2.0) | 2 (13) | 1067 | 1397 | 102 | 1.3 |

TABLE II-continued

| Ex. No. | Burst Pressure psi ($10^3$ kPa) | Effective Air Permeability*() | Fiber Dimensions (microns) | | min. wall | Water* Air |
|---|---|---|---|---|---|---|
| | | | i.d. | o.d. | | |
| 7 | 145 (1.0) | 25 (153) | 1372 | 1651 | 127 | 1.3 |
| 8 | 160 (1.1) | 19 (113) | 1295 | 1575 | 114 | 1.3 |
| 9 | 200 (1.4) | 89 (540) | 1181 | 1372 | 89 | 1.3 |
| 10 | 155 (1.1) | 180 (1092) | 1321 | 1524 | 76 | 1.3 |
| 11 | 300 (2.1) | 260 (1565) | 575 | 808 | 99 | 1.3 |
| 12 | 260 (1.8) | 530 (3175) | 600 | 828 | 114 | 1.3 |

*$10^{-4}$ cm$^3$/cm$^2$ · sec · cmHg
**SCFH/ft$^2$ · 100 psi
***Effective water selectivity, or ratio of effective water permeability to effective air permeability

EXAMPLE 13

A selective coating or film was formed on the inner surface or lumens of the support fibers of Example 2 by first forcing an aqueous 3 wt % polyethyleneimine (PEI) solution into the fiber lumens for 2 minutes at room temperature. The PEI solution was then allowed to drain from the fibers before a second solution consisting of 3 wt % dicarboxypropyl acid chloride-terminated polydimethylsiloxane (DISAC) in hexane was forced into the fiber lumens for 2 minutes at room temperature. The second solution was drained from the fiber lumens for 2 minutes. This coating procedure was then repeated. The hollow support fibers so prepared were then dried for 15 hours forcing air through the lumens of the fibers at room temperature.

The PEI-DISAC-coated microporous hollow support fibers were formed into an 0.074 m$^2$ (0.8 ft$^2$) bundle and incorporated into a module of substantially the same configuration as that shown in FIG. 3 with a polyurethane potting composition, then tested by passing a humid air stream having a 34° C. dewpoint through the fiber lumens at 100 psi (786 kPa) and adjusting the feed flow rate (equal to the sum of permeate and raffinate rates) to produce a raffinate stream with a −1.6° C. dewpoint. Effective water permeability was 341×10$^{-4}$ cm$^3$/cm$^2$·sec·cmHg (2080 SCFH/ft$^2$·100 psi) and effective air permeability was 1.1×10$^{-4}$ cm$^3$/cm$^2$·sec·cmHg (6.7 SCFH/ft$^2$·100 psi), thus yielding a water vapor selectivity of 310. Percent air loss from the feed stream to the permeate, calculated as 100×[permeate rate/feed rate], was 12.4%, or close to the theoretical value of 10.1%.

For comparison, the uncoated microporous hollow support fibers of Examples 2 and 4 were tested in the same air stream and adjusting the feed flow rate to produce a raffinate stream with a −2.5° C. dewpoint. Percent air loss from the feed stream to the permeate, calculated as 100×[permeate rate/feed rate], was 85%, or nearly seven-fold greater than that of the coated fibers.

EXAMPLES 14–18

Selective PEI/DISAC coatings were formed on the lumens of the PES support fibers of Example 11 using the coating technique described in Example 13, but varying the coating composition and number of coats as noted in Table III. The "Water/Air" entries in Table III and in all tables herein are the values for the ratios of effective water vapor permeabilities to effective feed gas permeabilities (or water vapor selectivities) for the composite hollow fiber membranes used for drying. All composite fibers were dried for 15 hours and incorporated into 0.074 m$^2$ (0.8 ft$^2$)

TABLE III

| Ex. No. | PEI | Concentration (wt %) DISAC | No. Coats | Feed Rate* () | Water Permeability* (****) | Water Air | % Air Loss |
|---|---|---|---|---|---|---|---|
| 14 | 3 | 3 | 2 | 0.71 (1.39) | 67 (408) | 25 | 21 |
| 15 | 3 | 3 | 3 | 0.30 (0.60) | 70 (424) | 53 | 16 |
| 16 | 3 | 3 | 4 | 0.44 (0.87) | 66 (401) | 79 | 15 |
| 17 | 4 | 2 | 2 | 0.43 (0.85) | 75 (460) | 59 | 16 |
| 18 | 10 | 4 | 2 | 0.13 (0.25) | 86 (525) | 310 | 12 |

*cm$^3$/cm$^2$ · sec
**SCFM/ft$^2$
***$10^{-4}$ cm$^3$/cm$^2$ · sec · cmHg
****SCFH/ft$^2$ · 100 psi

EXAMPLE 19

Selective coatings were formed on the lumens of the support fibers of Example 3 by first forcing an aqueous 4% PEI solution into the fiber lumens for 1 minute at room temperature. The PEI solution was then displaced by forcing a second solution, containing 4 wt % DISAC in hexane, through the fiber lumens. After 30 seconds contact time, residual DISAC/hexane solution was displaced with compressed nitrogen for about 30 seconds. Then a solution of 0.1% trimesoylchloride (TMC) in hexane was forced into the fiber lumens and immediately allowed to drain. The PEI-DISAC-TMC-coated fibers were then dried for 15 hours by forcing air through the fiber lumens at room temperature.

The coated fibers were then tested in the manner described in Example 13 by passing a humid air stream having a 25° C. dewpoint through the lumens and adjusting the feed flow rate to produce the raffinate streams noted in Table IV. For the tests in which the permeate pressure was 0.23 psia (0.11 kPa), a permeate-side vacuum pump was used.

TABLE IV

| Feed Rate* () | Raffinate Dewpoint °C. | Permeate Pressure | | Permeability* (****) | | Water Air | % Air Loss |
|---|---|---|---|---|---|---|---|
| | | psia | (kPa) | Water | Air | | |
| 1.04 (2.04) | −9.2 | 0.23 | (0.11) | 52 (315) | 0.26 (1.6) | 200 | 1 |
| 0.10 (0.20) | 3.7 | 13.3 | (6.2) | 8.0 (49) | 0.28 (1.7) | 29 | 15 |
| 0.07 (0.13) | 9.5 | 13.3 | (6.2) | 1.1 (7) | 0.28 (1.7) | 4 | 21 |
| 0.05 (0.10) | 6.0 | 13.3 | (6.2) | 1.3 (8) | 0.28 (1.7) | 5 | 28 |

*$cm^3/cm^2 \cdot sec$
**$SCFM/ft^2$
***$10^{-4} cm^3/cm^2 \cdot sec \cdot cmHg$
****$SCFH/ft^2 \cdot 100 psi$

EXAMPLE 20

A selective coating was formed on the lumens of the support fibers of Example 5 by forcing an aqueous 4 wt % PEI solution through the fiber lumens for about 2 minutes, then displacing the PEI solution by forcing a second solution containing 0.5 wt % toluene-2,4-diisocyanate (TDI) in hexane through the lumens, to commence crosslinking. After 30 seconds contact time, residual TDI/hexane solution was removed with compressed nitrogen, and the fibers were then heat cured in a 100° C. oven for 30 minutes with circulating hot air being forced through the lumens, to complete crosslinking.

The crosslinked PEI-coated fibers were tested in the manner described in Example 13 by passing a humid air stream having a 25° C. dewpoint through the lumens, and adjusting the feed flow rate to produce the raffinate dewpoints noted in Table V. A permeate-side vacuum pump was used to produce the 0.39 psia (0.18 kPa) permeate pressures.

TABLE V

| Feed Rate* () | Raffinate Dewpoint °C. | Permeate Pressure psia (kPa) | Permeability* (****) | | Water Air | % Air Loss |
|---|---|---|---|---|---|---|
| | | | Water | Air | | |
| 0.29 (0.57) | −42.0 | 0.39 (0.18) | 24 (147) | 0.61 (3.7) | 40 | 12 |
| 0.54 (1.06) | −36.0 | 0.39 (0.18) | 51 (313) | 0.49 (3.0) | 104 | 5 |
| 1.04 (2.06) | −4.7 | 0.39 (0.18) | 46 (279) | 0.46 (2.8) | 100 | 3 |
| 1.55 (3.06) | 4.4 | 0.39 (0.18) | 46 (279) | 0.44 (2.7) | 103 | 2 |
| 0.29 (0.57) | 14.7 | 13.5 (6.3) | 10 (64) | 0.64 (3.9) | 16 | 10 |

*$cm^3/cm^2 \cdot sec$
**$SCFM/ft^2$
***$10^{-4} cm^3/cm^2 \cdot sec \cdot cmHg$
****$SCFH/ft^2 \cdot 100 psi$

EXAMPLE 21

Microporous-walled polypropylene hollow support fibers having pores of 0.02 micron and an inner diameter of 400 microns were obtained from Hoechst Celanese Corporation of Charlotte, North Carolina (CELGARD X-20). A selective coating was formed on the lumens of the support fibers by first drawing an aqueous 3 wt % PEI solution into the lumens for 2 minutes. The PEI solution was then displaced by forcing a second solution containing 3 wt % DISAC in hexane through the lumens. The time to displace the PEI solution by the DISAC solution was 60 seconds. After 60 seconds contact time, residual DISAC/hexane solution was removed with compressed air. This coating procedure was repeated, and fibers were dried for 15 hours by forcing air through the fiber lumens at room temperature.

The PEI/DISAC-coated fibers were tested in the manner described in Example 13 by passing a humid air stream having a 35° C. dewpoint through the lumens, and adjusting the feed flow rate to produce a raffinate stream having a −2.3° C. dewpoint. Effective water vapor permeability was $44 \times 10^{-4}$ $cm^3/cm^2 \cdot sec \cdot cmHg$ (270 SCFH/ft$^2 \cdot$100 psi), while effective air permeability was $0.57 \times 10^{-4}$ $cm^3/cm^2 \cdot sec \cdot cmHg$ (3.5 SCFH/ft$^2 \cdot$100 psi), yielding a water vapor selectivity of 77. Air loss from the feed stream to the permeate was 15.5%.

For comparison, a module containing the same fibers without any coating was prepared and tested in the same manner on the same feed stream with the same raffinate dewpoint; air loss to the permeate stream approached 100%.

EXAMPLE 22

A selective coating was formed on the lumens of the support fibers of Example 11 using the coating procedure described in Example 21.

The PEI/DISAC-coated fibers were tested in the same manner as described in Example 13, with the raffinate stream having a dewpoint of −20° C. Effective water vapor permeability was $163 \times 10^{-4}$ $cm^3/cm^2 \cdot sec \cdot cmHg$ (1020 SCFH/ft$^2 \cdot$100 psi), while effective air permeability was $0.28 \times 10^4$ $cm^3/cm^2 \cdot sec \cdot cmHg$ (1.7 SCFH/ft$^2 \cdot$100 psi), yielding a water vapor selectivity of 600. Air loss to the feed stream was 16.3%.

EXAMPLE 23

A selective coating was formed on the lumens of the support fibers of Example 12 using the coating procedure described in Example 21.

The PEI/DISAC-coated fibers were tested in the same manner as described in Example 13, with the feed stream having a dewpoint of 35° C. and the raffinate stream having a dewpoint of −20° C. Effective water vapor permeability was $119 \times 10^{-4}$ $cm^3/cm^2 \cdot sec \cdot cmHg$ (725 SCFH/ft$^2 \cdot$100 psi), while effective air permeability was $2.1 \times 10^{-4}$ $cm^3/cm^2 \cdot sec \cdot cmHg$ (13 SCFH/ft$^2 \cdot$100 psi), yielding a water vapor selectivity of 58. Air loss to the feed stream was 22%.

EXAMPLE 24

A selective coating was formed on the lumens of the support fibers of Example 11 using the coating procedure described in Example 22 except that the time to displace the PEI solution from the lumens by the DISAC solution was adjusted to 10 seconds.

The PEI/DISAC-coated fibers were tested in the same manner as described in Example 13, with the results shown in Table VI.

TABLE VI

| Feed Rate* () | Dewpoint (% °C.) Feed Raff. | Permeability* (****) Water | Air | Water Air | % Air Loss |
|---|---|---|---|---|---|
| 0.40 (0.77) | 35 −3 | 293 (1755) | 0.90 (5.4) | 325 | 12.7 |
| 0.26 (0.51) | 35 −20 | 95 (571) | 0.93 (5.6) | 102 | 19.2 |

*$cm^3/cm^2 \cdot sec$
**$SCFM/ft^2$
***$10^{-4} cm^3/cm^2 \cdot sec \cdot cmHg$
****$SCFH/ft^2 \cdot 100 psi$

EXAMPLES 25–29

These examples demonstrate that effective water vapor permeability of the thin-film composite hollow fiber membrane of the present invention is increased by increasing the air permeability of the uncoated support fiber.

Microporous-walled hollow support fibers were prepared as described in Examples 6–10. The hollow fiber supports so prepared were incorporated into 0.093 m² (1 ft²) modules in the same manner described in Example 13.

Nitrogen permeabilities were determined by internally pressurizing the hollow support fibers contained in the modules with nitrogen and measuring the rate at which nitrogen passed through the hollow fiber walls by means of a gas flow meter connected to the module's permeate port. Effective air permeabilities calculated from the nitrogen permeabilities so obtained are set forth in Table VII.

Selective PEI/DISAC coatings were formed on the lumens of each of the same support fibers using the coating procedure described in Example 14.

The coated fibers were then tested for water vapor permeability and air loss from feed to permeate by passing a 75 psi (517 kPa) water vapor-containing air stream having a dewpoint of 22.6±2.7° C., through the lumens, and adjusting the feed flow rate to produce a raffinate stream with a dewpoint of 8.6±2.6° C. This test data also is shown in Table VII, and demonstrates that changes in the hollow support fibers that increase air permeability unexpectedly result in higher effective water permeability in the composite or coated hollow support fiber.

TABLE VII

| Ex. No. | Uncoated Permeability* (**) Air | Water | Coated Permeability* (**) Air | Water | Water Air | % Air Loss |
|---|---|---|---|---|---|---|
| 25 | 11 (65) | 13 (81) | 0.61 (3.7) | 12 (71) | 19 | 2.8 |
| 26 | 17 (106) | 22 (133) | 0.20 (1.2) | 23 (140) | 120 | 1.1 |
| 27 | 31 (189) | 39 (236) | 1.1 (6.4) | 31 (191) | 30 | 3.9 |
| 28 | 97 (593) | 122 (741) | 2.7 (16.4) | 42 (254) | 15 | 6.8 |
| 29 | 102 (620) | 127 (775) | 1.2 (7.4) | 49 (301) | 41 | 3.0 |

***$10^{-4} cm^3/cm^2 \cdot sec \cdot cmHg$
****$SCFH/ft^2 \cdot 100 psi$

EXAMPLE 30

This example illustrates the effectiveness of the present invention for the removal of water vapor from air at sub-atmospheric pressures, such as exist at high altitudes and in spacecraft. The PES hollow fibers of Example 9 were coated with crosslinked PEI using the technique described in Example 20. A module of substantially the configuration of FIG. 3 containing 0.69 m² (7.4 ft²) of active membrane surface area was constructed using these fibers. The module was operated on an air stream having a dewpoint of 23° C., at a feed pressure of 8 psia (3.8 KPa). The feed flow rate was set at 0.17 cm³/cm²·sec (0.33 SCFM/ft²), producing a raffinate having a dewpoint of 9° C. The effective water permeability was $48 \times 10^{-4}$ cm³/cm²·sec·cmHg (292 SCFH/ft²·100 psi), the ratio of water permeability to air permeability 5930, and the air loss 2.4%, demonstrating highly efficient gas dehydration even at subatmospheric pressures.

EXAMPLES 31–33

Composite hollow fiber membranes with PEI-DISAC-TMC coatings were fabricated in the same manner as Example 19, incorporated into three 0.093 m² (1 ft²) modules in the same manner described in Example 13 and tested on water vapor-containing methane gas as a feed gas, fed under positive pressure to the inlet port at 500 psi (3500 kPa). Feed gas composition, flow rates and results are shown in Table VIII.

TABLE VIII

| Example No. | Feed H₂O (ppm) | Feed Rate* (**) | Raffinate H₂O (ppm) | Efficiency H₂O Removal | % Gas Loss |
|---|---|---|---|---|---|
| 31 | 35 | 1.1 (2.2) | 4 | 89% | 8.3 |
| 32 | 45 | 1.9 (3.7) | 14 | 69% | 5.3 |
| 33 | 47 | 0.6 (1.2) | 7 | 85% | 10.6 |

*$cm^3/cm^2 \cdot sec$
**$SCFM/ft^2$

EXAMPLES 34–35

Additional highly-permeable, microporous-walled hollow support fibers were prepared at 30° C. in substantially the same manner as in Example 1 from the casting solutions and with the spinning conditions shown in Table IX. The resultant fibers had average burst pressures, dimensions, and effective air permeabilities as indicated in Table X.

TABLE IX

| Ex. No. | wt % Casting Solution Components | | | | | Vol % DMAC Lumen-Forming Solution | Inner Needle Diam (μm) | Polymer Flow Rate (g/min) | Ppn Bath Temp (°C.) | Ppn Bath Dwell (sec) | Annealing Conditions | |
|---|---|---|---|---|---|---|---|---|---|---|---|---|
| | PES | DMAC | NPr | H₂O | PVP | | | | | | Temp (°C.) | Time (min) |
| 34 | 24 | 61 | 10 | 5 | 0 | 62 | 405 | 2.0 | 25 | 15 | 90 | 60 |
| 35 | 25 | 60 | 10 | 5 | 0 | 65 | 405 | 2.0 | 25 | 15 | 90 | 60 |

TABLE X

| Ex. No. | Burst Pressure psi (10³ kPa) | Effective Air Permeability*(**) | Fiber Dimensions (microns) | | | Water+ Air |
|---|---|---|---|---|---|---|
| | | | i.d. | o.d. | Min. wall | |
| 34 | 320 (2.2) | 304 (1900) | 580 | 820 | 120 | 1.3 |
| 35 | 350 (2.4) | 144 (900) | 590 | 830 | 120 | 1.3 |

*$10^{-4}$ cm³/cm² · sec · cmHg
**SCFH/ft² · 100 psi
+ Effective water selectivity, or ratio of effective water permeability to effective air permeability

EXAMPLE 36

This Example demonstrates the use of a sweep stream comprising a portion of the dried raffinate gas. A selective coating was formed on the lumens of the support fibers of Example 34 using the coating procedure described in Example 13. The PEI/Disac-coated fibers were then tested in the same manner as described in Example 13, with the feed stream having a dewpoint of 35° C. and the raffinate stream having a dewpoint of −3° C. The performance of these fibers is shown in Table XI.

A portion of the raffinate stream was then passed on the permeate side of the fibers through a port near the raffinate end of the module to create a sweep stream. The performance of the module was then tested at several different sweep rates and feed flow rates, adjusting these flows to keep the raffinate dewpoint at −3° C. The performance of the module under these conditions is also shown in Table XI. These data show that through the use of such a sweep stream, the effective water vapor permeability and the water vapor selectivity can be increased, thus increasing the amount of feed air that can be dried with the same percentage air loss, while producing the same raffinate dewpoint.

TABLE XI

| Feed Rate* (**) | % Air Loss | % Sweep+ | Permeability++ | | Water Air |
|---|---|---|---|---|---|
| | | | Water | Air | |
| 0.13 (1.25) | 15.3 | 0 | 61 (380) | 0.36 (2.2) | 170 |
| 0.17 (0.32) | 14.5 | 2.7 | 88 (550) | 0.35 (2.2) | 250 |
| 0.21 (0.41) | 14.6 | 5.5 | 83 (520) | 0.35 (2.2) | 235 |
| 0.30 (0.57) | 14.6 | 8.3 | 78 (490) | 0.34 (7.1) | 230 |

*cm³/cm² · sec
**SCFM/ft²
+ portion of raffinate
++ $10^{-4}$ cm³/cm² · sec · cmHg (SCFH/ft² · 100 psi)

EXAMPLE 37

A selective coating or film was formed on the inner surface or lumens of the support fibers of Example 35 by first forcing 1 wt % aqueous solution of p-xylylenediamine (pXDA) containing 0.5 wt % triethylamine (as an acid scavenger) and 0.05 wt % sodium lauryl sulfate surfactant into the fiber lumens for 2 minutes at room temperature. The pXDA solution was then displaced by forcing a second solution containing 0.2 wt % trimesoyl chloride (TMC) in hexane through the lumens, to initiate crosslinking. After 30 seconds contact time, residual TMC/hexane solution was removed with compressed helium, and the fibers were then heat-cured at 60° C. in an oven for 30 minutes with circulating hot air being forced through the lumens.

The pXDA/TMC-coated fibers were tested in the manner described in Example 13 by passing a humid air stream having a 35° C. dewpoint through the lumens, and adjusting the feed and sweep flow rates to produce the raffinate dewpoints noted in Table XII. The permeate pressure was adjusted to 14.7 psia (6.8 kPa). These data show that extremely high water vapor selectivities can be obtained using the pXDA/TMC coating.

TABLE XII

| Feed Rate* (**) | Dewpoint (°C.) | | % Air Loss | % Sweep+ | Permeability++ | | Water Air |
|---|---|---|---|---|---|---|---|
| | Feed | Raff. | | | Water | Air | |
| 0.27 (0.52) | 35 | −3 | 13 | 17.3 | 48 (300) | <0.003 (0.02) | >16,000 |
| 0.43 (0.82) | 35 | −3 | 15 | 14.8 | 50 (310) | <0.003 (0.02) | >16,700 |
| 0.54 (1.04) | 35 | −3 | 16 | 15.8 | 54 (335) | <0.003 (0.02) | >18,000 |
| 0.20 (0.38) | 35 | −37 | 20 | 19.5 | 46 (290) | <0.003 (0.02) | >15,000 |
| 0.31 (0.60) | 35 | −23 | 20 | 19.8 | 50 (310) | <0.003 (0.02) | >16,700 |
| 0.47 (0.90) | 35 | −12 | 20 | 19.7 | 53 (330) | <0.003 (0.02) | >17,700 |
| 0.62 (1.20) | 35 | −6 | 20 | 19.8 | 54 (335) | <0.003 (0.02) | >18,000 |

*cm³/cm² · sec
**SCFM/ft²
+ portion of raffinate
++ $10^{-4}$ cm³/cm² · sec · cmHg (SCFH/ft² · 100 psi)

EXAMPLE 38

A selective coating was formed on the lumens of the support fibers of Example 35 using the coating procedure described in Example 37.

The pXDA/TMC-coated fibers were tested in the same manner as described in Example 13 except that a partial vacuum was applied to the permeate side of the membrane. The sweep stream was created by introducing a portion of the dried gas raffinate stream on the permeate side of the fibers through a permeate port located near the raffinate end. The results of these tests are shown in Table XIII.

TABLE XIII

| Feed Rate* (**) | Dewpoint (°C.) Feed | Dewpoint (°C.) Raff. | Permeate Pressure psia (kPa) | % Air Loss | % Sweep+ | Permeability++ Water | Permeability++ Air | Water Air |
|---|---|---|---|---|---|---|---|---|
| 0.12 (0.24) | 35 | −40 | 1.5 (10.3) | 2.4 | 1.0 | 83 (520) | 0.01 (0.065) | 8300 |
| 0.22 (0.42) | 35 | −40 | 1.5 (10.3) | 2.4 | 1.6 | 56 (350) | 0.01 (0.065) | 5600 |
| 0.33 (0.63) | 35 | −40 | 1.5 (10.3) | 2.7 | 2.2 | 62 (390) | 0.01 (0.065) | 6200 |

*$cm^3/cm^2 \cdot sec$
**$SCFM/ft^2$
+ portion of raffinate
++ $10^{-4} cm^3/cm^2 \cdot sec \cdot cmHg$ ($SCFH/ft^2 \cdot 100$ psi)

EXAMPLE 39

A selective coating was formed on the lumens of the support fibers of Example 34 by forcing a 5 wt % solution of polyvinyl alcohol (PVA) in water through the fiber lumens for 30 seconds at 40° C. The PVA solution was displaced from the lumens using compressed nitrogen, and the coating was heat cured in a 50° C. oven for 1 hour with circulating hot air forced through the lumens.

The PVA-coated fibers were then tested in the manner described in Example 13 by passing a humid air stream having a 35° C. dewpoint through the lumens, and adjusting the feed and sweep flow rates to produce a raffinate stream having a 20° C. dewpoint. Effective water vapor permeability was $7.4 \times 10^{-4}$ $cm^3/cm^2 \cdot sec \cdot cmHg$ (46 $SCFH/ft^2 \cdot 100$ psi), while effective air permeability was $0.09 \times 10^{-4}$ $cm^3/cm^2 \cdot sec \cdot cmHg \cdot sec \cdot cmHg$ (0.55 $SCFH/ft^2 \cdot 100$ psi), yielding a water vapor selectivity of 82.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A gas dehydration process comprising:
   (a) contacting a feed gas containing water vapor with the lumen side of thin film composite hollow fiber membranes arranged substantially parallel to each other in a chamber having a feed end and a raffinate end and a permeate port near the feed end, each of said composite hollow fiber membranes having an effective water vapor permeability greater than $33 \times 10^{-4}$ $cm^3/cm^2 \cdot sec \cdot cmHg$ (200 $SCFH/ft^2 \cdot 100$ psi) and a ratio of effective water vapor permeability to effective feed gas permeability of at least 100 and comprising
      (i) a highly permeable support fiber having an effective air permeability greater than $33 \times 10^{-4}$ $cm^3/cm^2 \cdot sec \cdot cmHg$ (200 $SCFH/ft^2 \cdot 100$ psi) and a ratio of effective water vapor permeability to effective air permeability of less than 2, and
      (ii) a coating on the lumens of said support fiber, said coating consisting essentially of a hydrophilic polymer that has a ratio of effective water vapor permeability to effective feed gas permeability of at least 100;
   (b) permitting water in said feed gas to permeate from the lumens to the outside of said hollow fiber membranes to form a water-containing permeate and a dried raffinate gas; and
   (c) removing permeated water from said chamber at a permeate port near the feed end of said chamber.

2. The process of claim 1 wherein said composite hollow fiber membranes have an effective air permeability less than $1.3 \times 10^{-4}$ $cm^3/cm^2 \cdot sec \cdot cmHg$ (8 $SCFH/ft^2 \cdot 100$ psi).

3. The process of claim 1 wherein said composite hollow fiber membranes have an effective air permeability less than $0.08 \times 10^{-4}$ $cm^3/cm^2 \cdot sec \cdot cmHg$ (0.5 $SCFH/ft^2 \cdot 100$ psi).

4. The process of claim 1 wherein the feed gas is air.

5. The process of claim 1 wherein the feed gas comprises hydrocarbons containing one to three carbon atoms.

6. The process of claim 1 wherein the feed gas comprises acid gases.

7. The process of claim 1 wherein, prior to removing permeated water from said chamber, a portion of said dried raffinate gas is mixed with said permeated water at a point generally opposite the feed end of said chamber.

8. The process of claim 7 wherein said point of mixture of said dried raffinate gas with said permeated water is at a permeate port near the raffinate end of said chamber.

9. The process of claim 7 wherein the portion of dried raffinate gas is between 2% and 50% of its total.

10. The process of claim 7 wherein the portion of dried raffinate gas is less than 30% of its total.

11. The process of claim 7 wherein the portion of dried raffinate gas is between 10% and 15% of its total.

12. The process of claim 1 wherein the feed gas is at a pressure of at least 7 atm (707 kPa).

13. The process of claim 1 or 7 wherein a vacuum is used to lower the pressure of the permeate.

14. The process of claim 13 wherein said vacuum is applied to said permeate port near the feed end of said chamber.

15. A dehydration module for removing water vapor from a feed gas comprising:
   (a) a chamber having feed and raffinate ends and a permeate port near the feed end;
   (b) a bundle of thin film composite hollow fiber membranes arranged substantially parallel to each other in said chamber, each of said composite hollow fiber membranes having an effective water vapor permeability greater than $33 \times 10^{-4}$ $cm^3/cm^2 \cdot sec \cdot cmHg$ (200 $SCFH/ft^2 \cdot 100$ psi) and a ratio of effective water vapor permeability to effective feed gas permeability of at least 100 and comprising
      (i) a highly permeable support fiber having an effective air permeability greater than $33 \times 10^{-4}$ $cm^3/cm^2 \cdot sec \cdot cmHg$ (200 $SCFH/ft^2 \cdot 100$ psi) and a ratio of effective water vapor permeability to effective air permeability of less than 2, and (ii) a coating on the lumens of said support fiber, said coating consisting essentially of a hydrophilic polymer that has a ratio of effective water vapor permeability to effective feed gas permeability of at least 100; and (c) sealing means for securing and sealing said bundle of hollow fiber membranes to said chamber shell at said feed and raffinate ends so as to permit the lumens of the hollow fiber membranes to be in fluid communication with said feed gas;

wherein said permeate port is in fluid communication with the outside of said hollow fiber membranes.

16. The dehydration module of claim 15 wherein said composite hollow fiber membranes have an effective air permeability of less than $1.3 \times 10^{-4}$ cm$^3$/cm$^2$·sec·cmHg (8 SCFH/ft$^2$·100 psi).

17. The dehydration of claim 16 wherein said composite hollow fiber membranes have an effective air pearmeability of less than $0.08 \times 10^{-4}$ cm$^3$/cm$^2$·sec·cmHg (0.5 SCFH/ft$^2$·100 psi).

18. The dehydration module of claim 15 wherein said support fiber of said thin film composite hollow fiber membrane is selected from polypropylene, polyvinylideneflourides, polyetherimides, polyimides, polysulfones, polyethersulfones, polyphenylsulfones, polyphenylquinoxalines, porous glass, porous ceramic, and porous metal.

19. The dehydration module of claim 15 wherein said hydrophilic polymer is formed by an interfacial polymerization of two mutually reactive species.

20. The dehydration module of claim 19 wherein one of said mutually reactive species is selected from polyfunctional amines and polyfunctional alcohols and the other of said two mutually reactive species is selected from polyfunctional acyl halides and polyfunctional isocyanates.

21. The dehydration module of claim 20, wherein said polyfunctional amine is polyethyleneimine and said polyfunctional acyl halide is a dicarboxylpropylacidchloride-terminated polydimethylsiloxane.

22. The dehydration module of claim 20 wherein said polyfunctional amine is p-xylylenediamine and said polyfunctional acyl halide is trimesoyl chloride.

23. The dehydration module of claim 19 wherein said hydrophilic polymer is post-treated with a low molecular weight polyfunctional compound reactive therewith.

24. The dehydration module of claim 23 wherein said low molecular weight multifunctional compound is trimesoyl chloride.

25. The dehydration module of claim 15 wherein said sealing means comprises plugs of polymer selected from thermoplastic polymers and thermosetting polymers.

* * * * *

UNITED STATES PATENT AND TRADEMARK OFFICE
CERTIFICATE OF CORRECTION

PATENT NO. : 5,108,464

DATED : April 28, 1992

INVENTOR(S) : Friesen, Newbold and McCray

It is certified that error appears in the above-identified patent and that said Letters Patent is hereby corrected as shown below:

Col. 5, line 54: after the word feed, delete "and" and insert -- end --

Col. 14, line 51: delete "0.28X10$^4$" and insert -- 0.28X10$^{-4}$ --

Col. 16, line 12: delete "***" and insert -- * --

Col. 16, line 13: delete "**" and insert --  --

Signed and Sealed this

Sixth Day of September, 1994

BRUCE LEHMAN

Attesting Officer     Commissioner of Patents and Trademarks